April 30, 1968

D. B. NEUMANN 3,380,358

RANGE GATED IMAGING SYSTEM

Filed Aug. 24, 1965

INVENTOR
D. B. NEUMANN

BY Harry A. Herbert Jr.
Robert Kern Duncan

ATTORNEYS

April 30, 1968  D. B. NEUMANN  3,380,358

RANGE GATED IMAGING SYSTEM

Filed Aug. 24, 1965   3 Sheets-Sheet 3

INVENTOR
D. B. NEUMANN

BY Harry A. Herbert Jr
Robert Kern Duncan

ATTORNEYS

United States Patent Office 3,380,358
Patented Apr. 30, 1968

3,380,358
RANGE GATED IMAGING SYSTEM
Don B. Neumann, 6722 Alter Road,
Dayton, Ohio 45424
Filed Aug. 24, 1965, Ser. No. 482,308
4 Claims. (Cl. 95—11.5)

ABSTRACT OF THE DISCLOSURE

A range gated imaging system in which a Q-switched ruby laser illuminates objects to be photographer with a 60 nanosecond illuminating pulse of energy. Through a controlled delay the shutter grid of an image converter camera tube is opened for 50 nanoseconds after an elapsed time corresponding to the travel time of the energy pulse from the laser to the object to be viewed and return, thus the image formed by the camera is not degraded by the unwanted reflections of nearer and farther objects.

---

The invention described herein may be manufactured by or for the Government for governmental purposes without the payment to me of any royalty thereon.

This invention relates to a system in which the image formed shows only those objects which fall between a certain controlled minimum distance and a certain controlled maximum distance from the imaging device. This is accomplished by illuminating the objects within the field of view with a very short pulse of light, and then opening a shutter in the imaging device at precisely the proper time ot allow the light returning from objects at the desired range to pass and form an image. Light returned from objects at too short a range arrives before the shutter opens and is, therefore, rejected, and light from objects at too long a range arrives after the shutter closes and is likewise rejected.

Since light travels about one foot in one nanosecond, it is necessary to have submicrosecond illuminating pulses if range resolutions of tens or hundreds of feet are desired. In order to obtain an image in such a short time, it is necessary to have the object illuminated to a very high intensity. Both the short time duration (tens of nanoseconds) and the high intensity may be obtained by using a Q-switched laser as the illuminating light source.

One use of the present invention concerns the reduction of the low visibility effects which occur when attempting to view objects under active illumination through atmospheric conditions which contain many light-scattering particles. (A common example is the backscattering of headlight illumination into the eyes of a motorist driving in fog or heavy snow.) In these cases, the "noise" light backscattered from the particles may completely swamp out the "signal" light returning from the desired object and the resulting image does not convey the information desired. By range gating, a very large percentage of this "noise" light can be eliminated and the desired image may thus be obtained.

Another use concerns the addition of range information to the image. For example, an aerial photograph taken with the range-gating system will show only those portions of the terrain which were a certain distance from the aircraft. A series of such photographs each taken with a different shutter delay will provide the necessary information for the compilation of an elevation contour map of the area.

It is an object of the present invention to provide an imaging system that is relatively unaffected by backscattered illumination.

It is another object of the present invention to provide a range gated imaging system.

It is another object of the present invention to provide an imaging system for contour mapping.

These and other objects and uses ancillary thereto will become apparent to those skilled in the art from the following detailed description to be read in connection with the accompanying drawings, in which.

Figure 1:
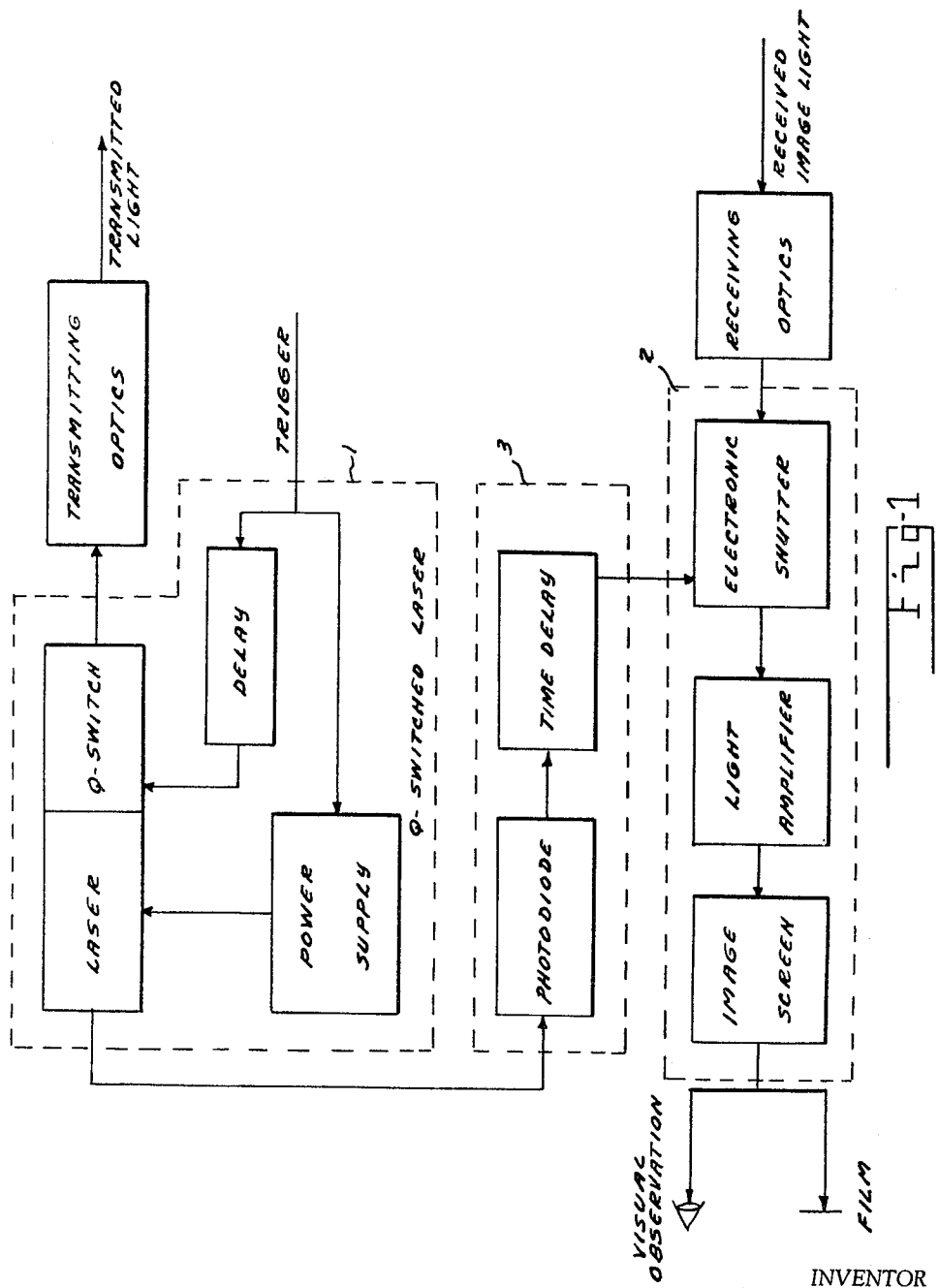
FIG. 1 is a block diagram of an embodiment of the invention.

Referring to FIG. 1, the invention comprises three primary elements, an illuminating light source 1 which emits in short (submicrosecond) pulses, with a pulse spacing not less and a pulse duration not greater than the time required for light to travel to the desired object and return; an image forming device 2 capable of collecting energy scattered from the desired object and forming an image of this object for display or recording, and equipped with a high-speed shutter which allows open times of approximately the time duration of a single illuminating pulse; and a timing device 3 which provides a desired delay between the emission of an illuminating pulse and the opening of the shutter.

Figure 2:
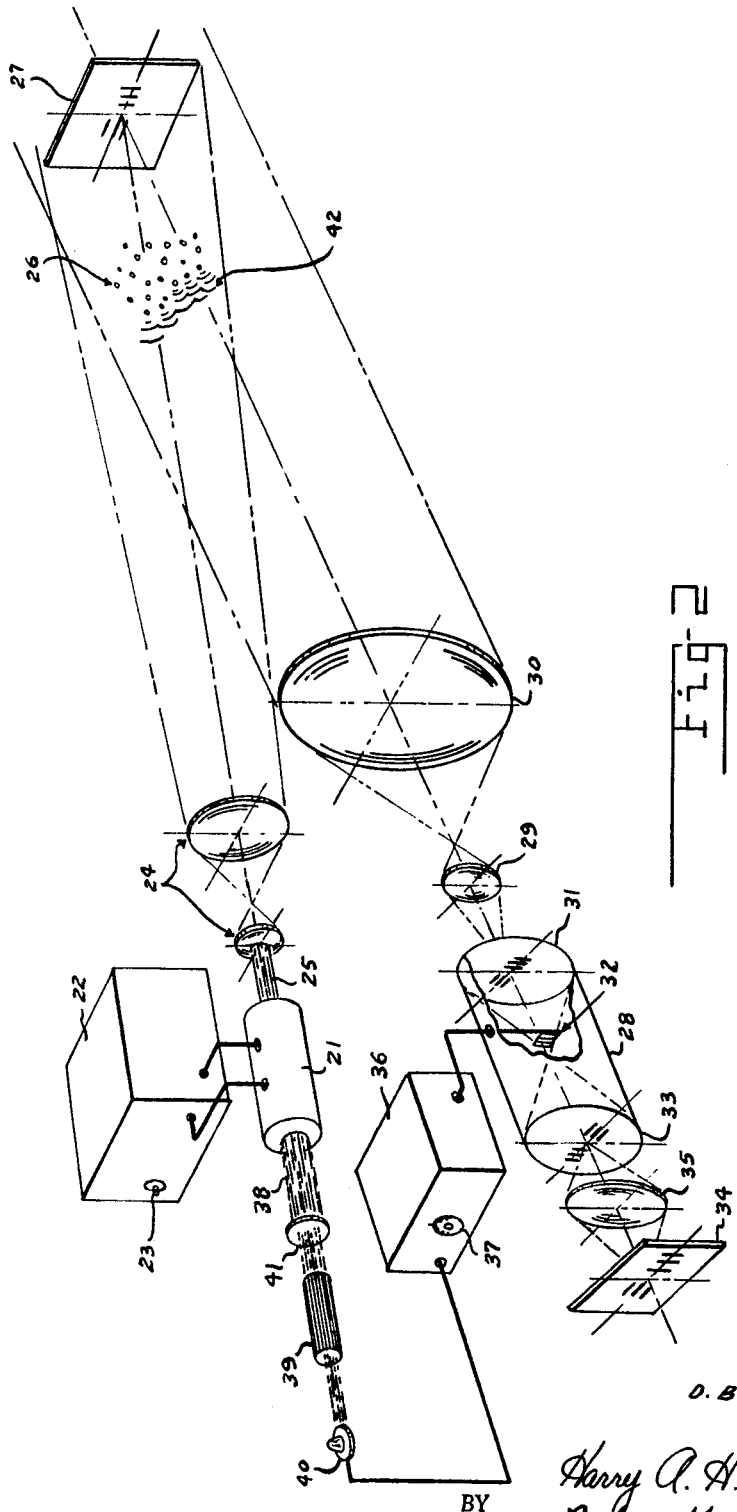
FIG. 2 is a pictorial view of an embodiment of the invention as used to minimize the effects of backscattering.

A specific operating embodiment of the invention is shown pictorially in FIG. 2. The illuminating source 21 is a Q-switched ruby laser which emits about 0.3 joule of energy per pulse with a pulse width of about 60-nanoseconds. The laser electronics and power supply unit 22 contains a manual trigger initiation button 23. It is to be understood that automatic or repetitive triggering may be used to form an effective continuous display, the only limitation being that previously set forth in regard to the pulse spacing being not less than the time for the illumination to travel to the desired object and return. Optics 24 are added to the radiating end of the laser to increase the emerging diameter of the laser beam 25 from approximately one-fourth inch to about three inches so as to eliminate the possibility of a few particles of snow, rain or other back scattering media 26 from blocking the entire illuminating beam, and to spread the illumination over the extent of the object 27 to be imaged.

In this embodiment the Q-switch used is of the Kerr cell and Wollaston prism type. The Q-switch electronics are such that the laser switch is open for about two-hundred microseconds. This results in a first giant pulse followed by a number of relaxation oscillations. The first of these oscillations does not occur for at least a microsecond after the giant pulse, and all of them are at a relatively low level; hence, they may generally be neglected.

The imaging device used in this embodiment comprised an image-converter camera having an image converter tube 28 and receiving optical lens 29 and 30. The collecting optical lens 30, which may be of the type used in conventional aerial cameras is an $f/4$, thirty-six inch focal-length lens. Lens 29 is a five-inch focal-length lens which magnifies the original image resulting in the two lenses forming approximately an $f/4$, twenty-foot focal-length optical system. The image formed by these lenses is focused on the S–1 photocathode 31 of the image converter tube 28. When a shutter pulse is applied to the camera tube shutter grid 32, photoelectrons are accelerated to the P–11 photoanode 33 which is imaged onto the film plane 34 by the rear lens system 35. The film may be removed and replaced by an eyepiece for a visual type of image presentation. Film having an ASA 3000 speed rating has been found to be satisfactory with this particular embodiment.

The electron beam in the image converter tube is gated by a pulse from the image tube electronics and delay circuitry 26 to the shutter grid 32 so as to give a 50 nanosecond shutter duration. Controlled delays in steps of 10 nanoseconds have been found to be very satisfactory. Variable control 37 sets the total delay period and is adjustable in 10 nanosecond steps. It is understood that the total delay time determines the range of the object that is imaged, thus the maximum and minimum range of step control 37 is made to encompass the desired ranges of the objects to be imaged. The operating embodiment being described has a delay range from approximately three hundred nanoseconds to approximately seven hundred nanoseconds. Laser light 38 emitted by leakage through the approximately ninety-eight percent reflective rear reflector of the laser enters a fiber optic bundle 39 which carries it to a photodiode 40 associated with the delay generator 36. This provides the reference time to synchronize the initiation of the start of the generated delay time between the transmitted light pulse and the camera shutter opening. The light is passed through a ten-angstrom red filter 41 before it enters the fiber optic bundle to prevent triggering of the delay circuitry on the laser flash tube illumination. A variable attenuattor has been found to be desirable at the optic input to the delay generator to permit the trigger threshold to be adjusted to rigger the delay electronics on the giant pulse, but not on the subsequent relaxation oscillations.

As illustrated in FIG. 2 when the total delay is adjusted for the range of the object 27, only the illumination returning from the object and its immediate vicinity is passed by the shutter 32, hence, when the back-scattered illumination 42 from the particles 26 arrives at the imaging system the shutter has not yet opened and the desired image from the object will not be degraded by the illumination from the intervening particles.

Figure 3:
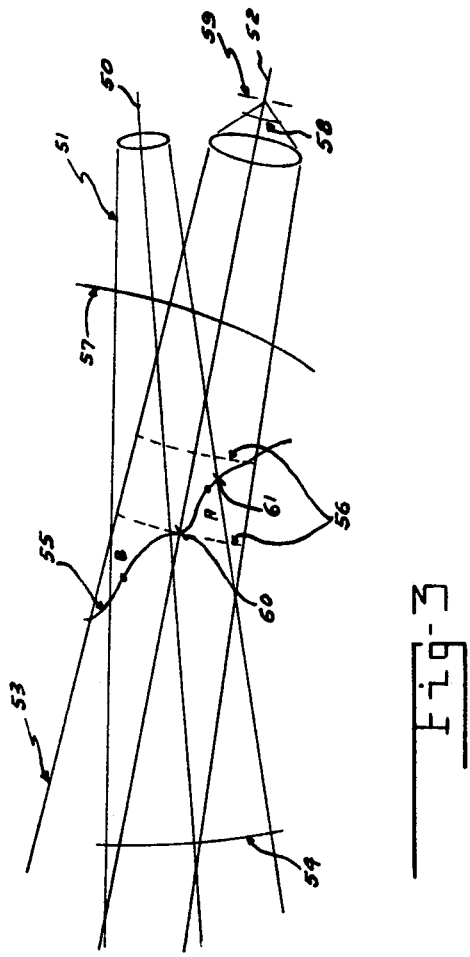
FIG. 3 is a schematic diagram illustrating the addition of range information to the received image for contour forming.

FIG. 3 illustrates the use of the invention for contour mapping. For illustration, the axis 50 of the illuminating beam 51 and the axis 52 of the receiving beam 53, commonly termed the camera field of view, are displaced more than would generally be the case.

Generally the imaging system would be physically arranged so that each of the beams would effectively converge at the imaging system in points that are relatively close together and the angle formed between the axes of the beams would be adjustable so that the complete system may be trained on the object that is to be imaged. A pulse of illumination travels out from the source forming the illuminating beam. At an arbitrary period of time after the pulse has left the source it is shown at position 54. The profile of an arbitrary object in the path of the beam is represented by the line 55. Part of the original illuminating pulse is reflected back toward the imaging camera by the object. The timing of the gate in the camera is shown adjusted so that it "sees" only what is represented by the gate interval 56. It is apparent that reflected illumination from some point such as B will be returning as represented by area 57 while light returning from some point such as A may be represented by the area 58. As shown, shutter 59 has just opened and will stay open long enough to pass the illumination 58, but it will be closed by the time illumination 57 arrives at the shutter. This the image formed will be the part of profile line 55 that is within the representative space-time gate 56 and that is illuminated by the illuminating pulse traveling down beam 51, i.e., in the illustration, that portion of profiile line 55 between marks 60 and 61.

While the invention has been described above in connection with a particular embodiment it is to be understood that such description is made only by way of example, and not as a limitation on the scope of the invention.

What is claimed is:

1. A range gated imaging system comprising: a Q-switched ruby laser wherein the said Q-switch is of the Kerr cell and Wollaston prism type for emitting a pulse of approximately 60 nanoseconds duration, the said laser having an emitting end and a reflective end, the reflective end having approximately two percent light leakage; trigger means for initiating said laser pulse; optical means cooperating with the said laser pulse for increasing the emerging diameter of the said laser pulse and forming an illuminating beam; red filter means cooperating with said laser light leakage for passing only filtered light of approximately ten angstroms in band width; means including a photodiode for generating an initiating signal; fiber optic means for conducting said filtered light to the said photodiode means; image converting means having at least an S–1 photocathode, a P–11 photoanode and a control shutter gride; optical means for focusing received illumination on the said photocathode and providing a receiving beam; means responsive to the said initiating signal for generating a control signal of approximately 50 nanoseconds duration at a determined manually variable time delay with respect to the said initiating signal; connecting means for applying the said control signal to the said shutter grid for forming an image on the said photoanode only during the said approximate 50 nanosecond duration; and presentation means including an optical lens cooperating with said photoanode for utilization of a received image.

2. The imaging system of claim 1 wherein the angle between the said illuminating beam and the said receiving beam is adjustable.

3. The imaging system of claim 1 wherein the said manually variable time delay is variable in approximately 10 nanosecond steps.

4. The imaging system of claim 3 wherein the angle between said illuminating beam and the said receiving beam is adjustable.

References Cited

UNITED STATES PATENTS

| | | | |
|---|---|---|---|
| 3,294,002 | 12/1966 | Vitkine | 95—11.5 |
| 3,305,633 | 2/1967 | Chernoch | 331—94.5 |

NORTON ANSHER, *Primary Examiner.*

FRED L. BRAUN, *Assistant Examiner.*